July 28, 1942.      F. B. DAVIS      2,291,572
ASSORTING MECHANISM
Original Filed Aug. 19, 1939      6 Sheets-Sheet 1
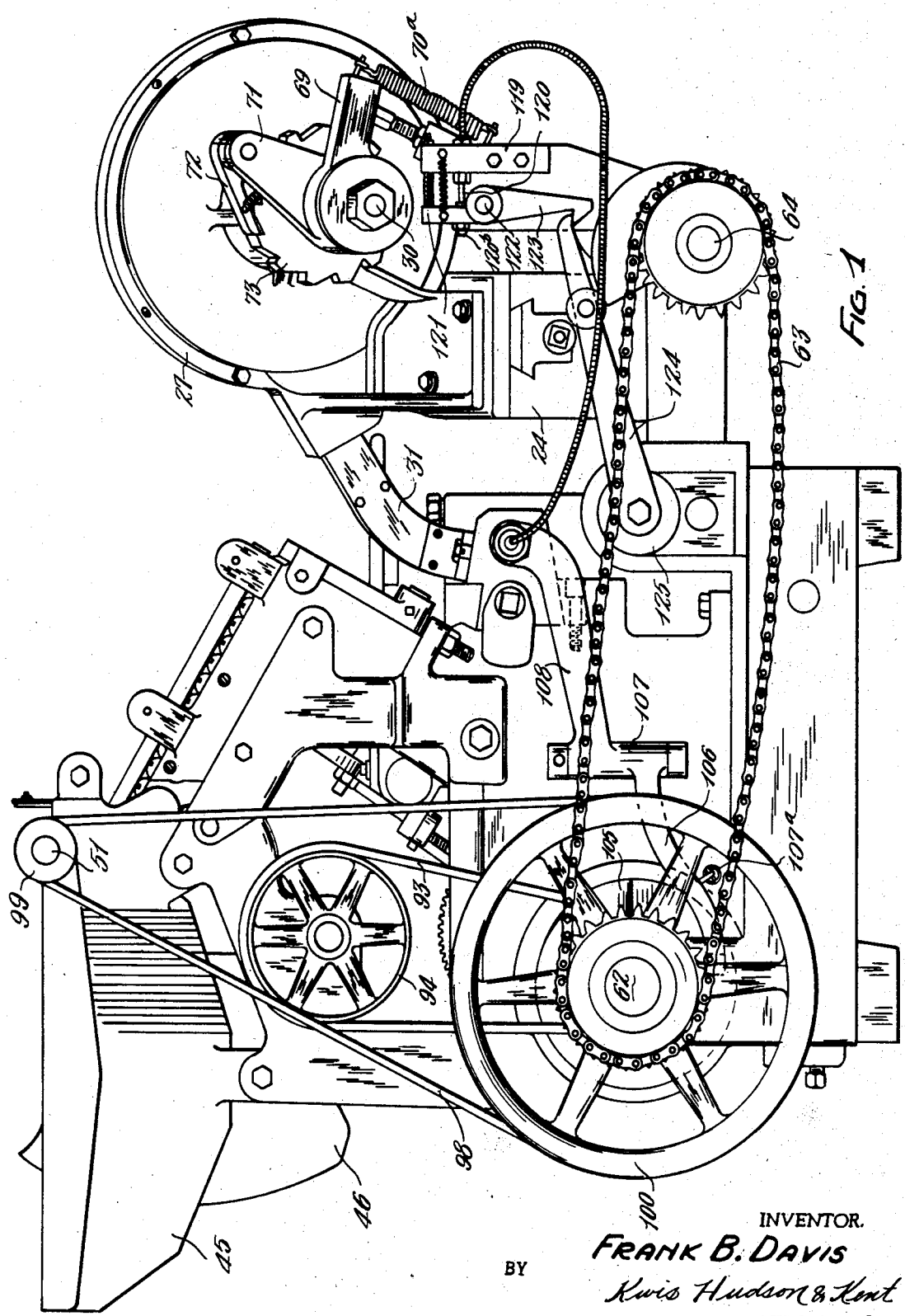
INVENTOR.
Frank B. Davis
BY Kwis Hudson & Kent
ATTORNEYS July 28, 1942.　　　　F. B. DAVIS　　　　2,291,572
ASSORTING MECHANISM
Original Filed Aug. 19, 1939　　　6 Sheets-Sheet 2
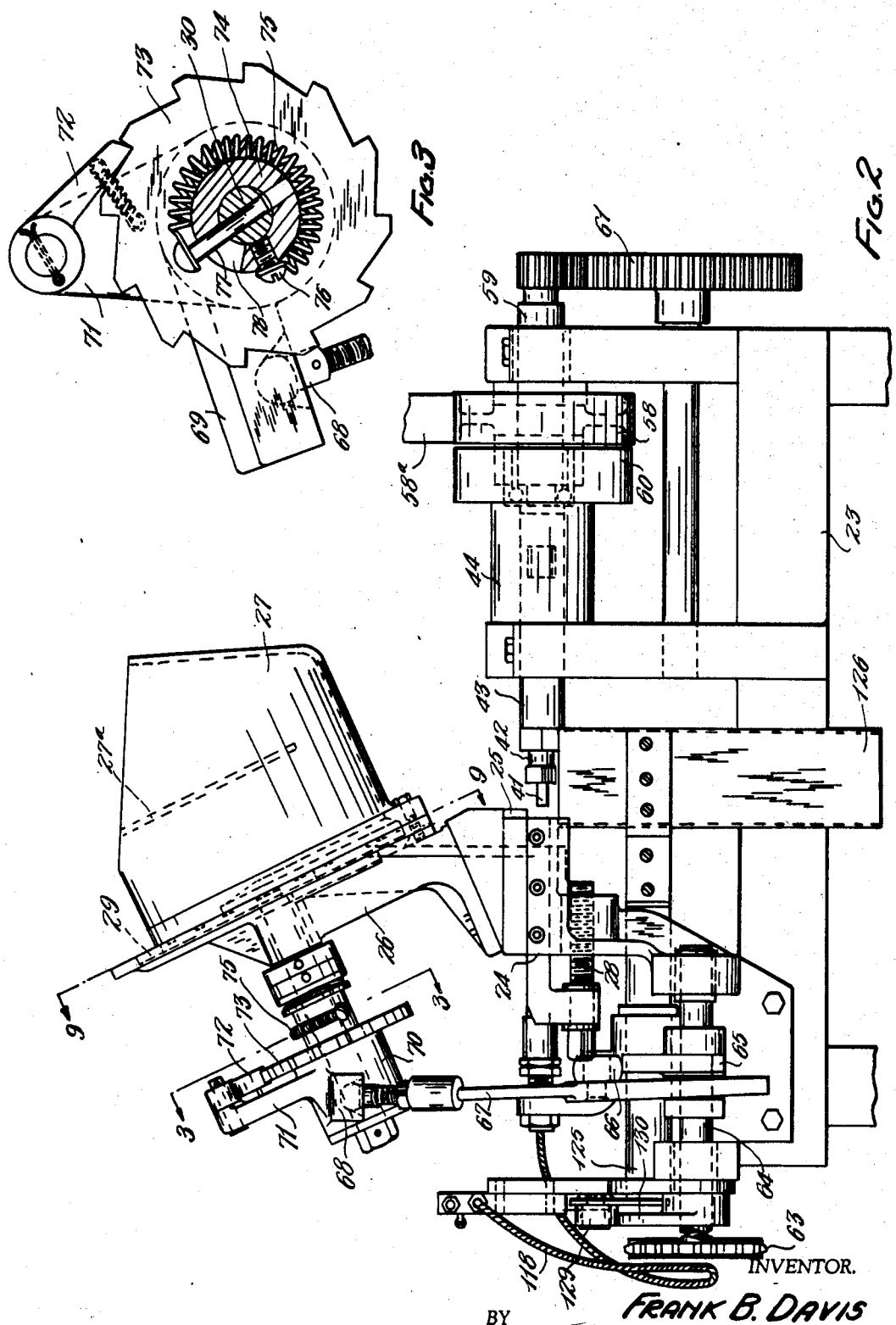
INVENTOR.
FRANK B. DAVIS
BY
Kwis Hudson & Kent
ATTORNEYS

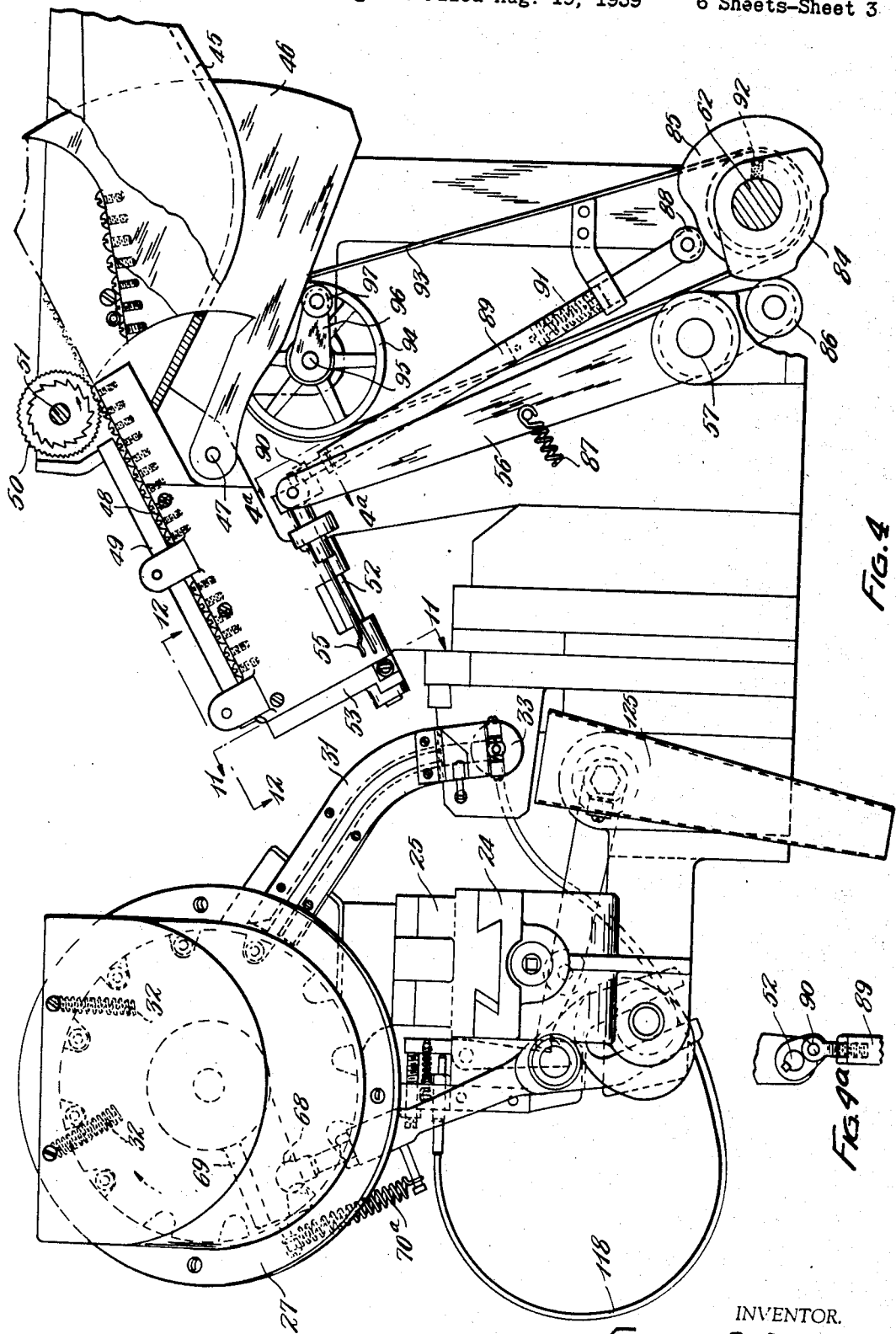

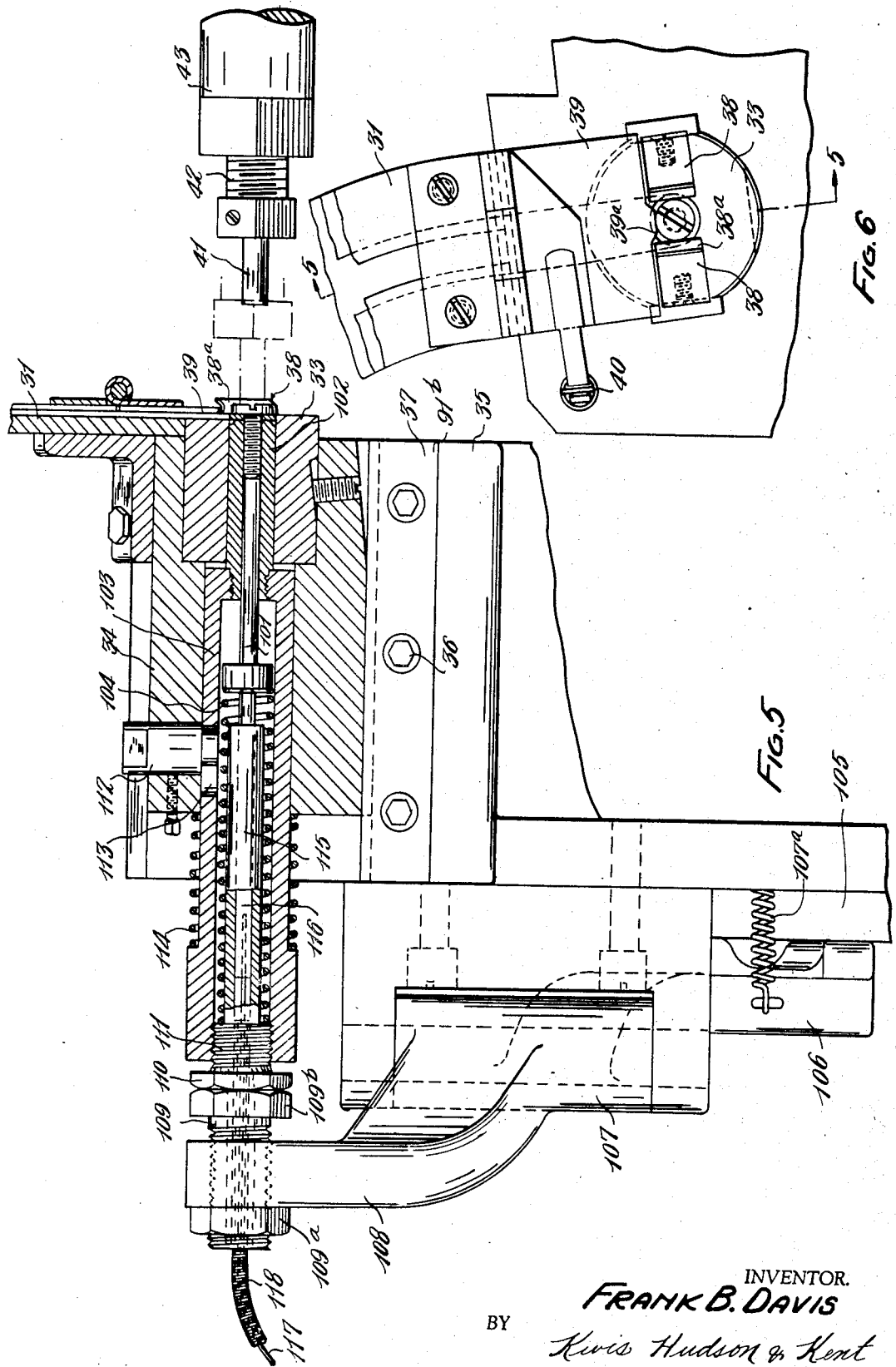

July 28, 1942.   F. B. DAVIS   2,291,572
ASSORTING MECHANISM
Original Filed Aug. 19, 1939   6 Sheets-Sheet 5

INVENTOR.
FRANK B. DAVIS
BY
Kwis Hudson & Kent
ATTORNEYS

July 28, 1942.  F. B. DAVIS  2,291,572
ASSORTING MECHANISM
Original Filed Aug. 19, 1939    6 Sheets-Sheet 6

INVENTOR.
FRANK B. DAVIS
BY Kwis Hudson & Kent
ATTORNEYS

Patented July 28, 1942

2,291,572

UNITED STATES PATENT OFFICE 2,291,572

ASSORTING MECHANISM

Frank B. Davis, University Heights, Ohio, assignor to The National Screw & Manufacturing Company, Cleveland, Ohio, a corporation of Ohio Original application August 19, 1939, Serial No. 291,049. Divided and this application August 20, 1941, Serial No. 407,614

4 Claims. (Cl. 209—82)

This invention relates to an assorting mechanism adaptable for use on machines for performing operations on products such as assembling operations, the purpose being to automatically separate from the properly formed or assembled products those which for different reasons may be defective.

This application is a division of my prior application Serial No. 291,049, filed August 19, 1939, for Assembling machine for screws and washers.

My invention finds special utility in machines for assembling lock washers and screws in which case it functions to separate from the assemblies which are of proper form or condition the screws which for any reason failed during the normal operation of the machine to receive washers as well as to separate any screws or screw and washer assemblies including screws longer than those utilized in any particular run of the machine to avoid the necessity of subsequent inspection and manual sorting. However, my invention may be utilized to advantage also on other types of machines.

The above and other objects are attained by the present invention which may be here briefly summarized as consisting in certain novel details of construction and combinations and arrangements of parts which will be described in the specification and set forth in the appended claims.

In the accompanying sheets of drawings I have shown my invention as applied to a machine for assembling washers onto screws and particularly lock washers onto screws the shanks of which have been threaded, the mechanism being such as to assemble the washers onto the unthreaded portions of the shanks of the screws next to the screw heads. However, the fact that the screws or screw elements are threaded before the washers are assembled thereon is not necessarily material to the present invention.

In the accompanying sheets of drawings.

Fig. 1 is an end elevation of an assembling machine embodying the present invention;

Fig. 2 is a front view looking toward the left of Fig. 1, some of the parts being omitted;

Fig. 3 is a detail sectional view on a larger scale substantially along the line 3—3 of Fig. 2;

Fig. 4 is a view partly in section and partly in end elevation looking at the opposite end from that shown in Fig. 1, the bed of the machine being omitted;

Fig. 4a is a fragmentary view taken on the line 4a—4a of Fig. 4 showing the manner of actuating the shaft and screw delivery segment plate;

Fig. 5 is a fragmentary sectional view on an enlarged scale, the section being taken substantially along the line 5—5 of Fig. 6;

Fig. 6 is a fragmentary elevation looking particularly at the assembly die and the point at which the assembling of the screw and the washer takes place;

In the present assembling machine, the screws are fed from one hopper and the washers from another hopper, and mechanism is provided so that during each cycle of the machine a washer and a screw are brought to the assembly point with the washer held in a given position in a die and with the screw positioned opposite the central opening in the washer, and then a plunger pushes the screw forwardly through the opening in the washer so as to position the washer on the shank of the screw next to the screw head. Then the screw and washer assembly is pushed out of the die and is delivered to a receiving receptacle, but if for any reason the screw fails to receive a washer or if the screw is somewhat longer than desired, then the screw or the longer screw with the assembled washer is by an assorter caused to be discharged into another receptacle.

Figure 13:
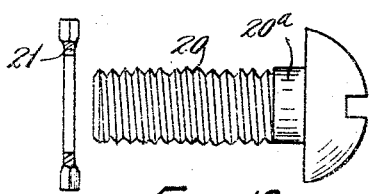
Fig. 13 shows one of the screws and the washer prior to assembly, the washer here shown being toothed at its outer periphery only.
Figure 14:
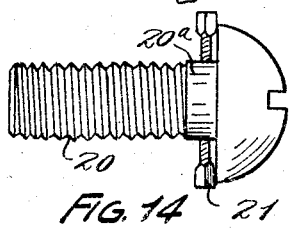
Fig. 14 is a view of the same after the assembling operation, the washer in Figs. 13 and 14 being in section and the screw being in elevation.
Figure 15:
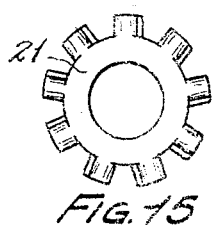
Fig. 15 is a side view of the washer shown in Figs. 13 and 14.
Figure 16:
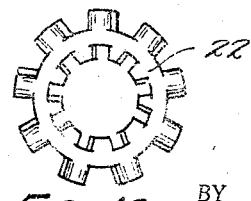
Fig. 16 is a view similar to Fig. 15 showing a lock washer toothed at both its inner and its outer peripheries.

With the present assembling machine the screws are preferably such as illustrated in Figs. 13 and 14 and designated 20, these screws having their shanks threaded prior to assembly with the washers, and in the assembling operation by an endwise movement of the screw when aligned with the opening in the washer 21 as shown in Fig. 13, the washer is moved onto a short unthreaded portion 20a of the screw next to the screw head, as shown in Fig. 14. The unthreaded portion 20a may be cylindrical or slightly tapered, but in either event the washer will be slid on and after assembly will have a friction-tight fit on the unthreaded portion of the screw next to the head. The washers are preferably lock washers which may be toothed at their outer periphery as shown in Figs. 13, 14, and 15, or they may be toothed at their inner periphery or at both the inner and outer peripheries as shown at 22 in Fig. 16, or they may be otherwise shaped to serve as lock washers.

I wish to make clear, however, that while the present assembling machine is used principally in the assembling of lock washers and screws whose shanks are threaded prior to the assembling operation, it may be used also in the assembling of washers and screw blanks the shanks of which are adapted to be threaded after the assembling operation. Likewise, the invention has utility in the assembling of plain washers on screws with threaded or unthreaded shanks. Therefore in the following description the term "screw" is to be understood to include a screw whose shank has been threaded or is unthreaded at the time the assembling occurs, and the term "washer" will apply to a washer which is formed as a lock washer in any of the standard ways or which is a plain washer.

Figure 10:
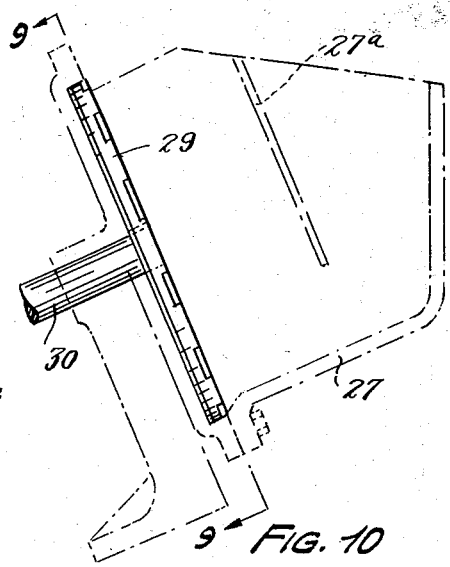
Fig. 10 is a side view of the disk with some of the associated parts shown by dotted lines.

The assembling machine includes a suitable bed or frame 23 which may be formed in any suitable manner and which has an extension 24 (Figs. 1, 2, and 4) on which is mounted a normally stationary but horizontally adjustable block 25 to which is secured a standard 26 supporting the hopper 27 for the washers. By means of an adjusting screw 28, best shown in Fig. 2, the position of the hopper 27 and the parts associated therewith may be adjusted to accommodate screws of different lengths. The washer hopper 27 is provided with a pick-up and delivery member 29 in the form of a disk which is in an inclined position, being preferably inclined about 26° from the vertical. The disk 29 is secured to an inclined shaft 30 journaled in a boss at the upper end of the standard 26 and adapted to be given a step-by-step movement by mechanism to be referred to presently. This disk 29 is provided with peripheral notches 29a which are somewhat U-shaped and are of a size large enough to accommodate one of the washers. A quantity of washers is placed in the hopper behind a partition 27a (Figs. 2 and 10) which partition extends across the hopper toward but not to the bottom.

The washers pass underneath this partition into engagement with the lower section of the disk 29, and, as the disk is given this step-by-step movement, the washers lodge individually in the notches 29a, and as they pass upwardly with the disk above the quantity of washers, they are retained in the notches by reason of the inclined position of the disk. When they reach a given position they drop one at a time into a delivery chute 31. Generally each notch contains a single washer but if, as sometimes happens, two washers become lodged in any of the notches, the extra washers are brushed off before they reach the point of delivery to the chute 31 by depending coil springs 32 attached to the hopper so as to extend over the inclined front face of the disk.

For each cycle of the machine (during which a washer is assembled on a screw), the disk 29 is given a step-by-step movement equivalent to the distance between the notches 29a, and when a notch with a washer in it reaches the upper end of the chute 31, at which point the opening in the chute communicates with the interior of the hopper in line with the notched face of the disk 29, the washer slides or rolls out of the notch into the chute opening and slides down the chute, it being noted that there is never more than one washer in the chute. After sliding the length of the chute, the washer comes to a stop at the point where the assembling occurs in the U-shaped bottom of a notch in a die 33 (see particularly Figs. 4, 5, and 6). This die 33 is carried by an adjustable die block or holder 34 (see Fig. 5) adjustably mounted in an extension 35 of the frame 23. The upper end of the chute 31 is attached to the washer hopper 27 and its lower end is attached to the die block 34, and when it is desired to adjust the machine for screws of different lengths, this die block 34 will be loosened by retracting screws 36 passing through a gib 37 so that, when the hopper 27 is adjusted by means of the adjusting screw 28, the hopper, the guide chute, and the die will be adjusted as a unit.

When the washer reaches the base of the slot of the die 33, which slot forms a continuation of the slot in the chute 31, it is temporarily held in that position and prevented from tipping forward by a pair of leaf springs 38 which are secured to the sides of the die 33, these leaf springs having yieldable forwardly and laterally bent ends 38a. Assisting in holding the washers in the position just stated is a lip 39a of a hinge plate 39 hinged to the lower part of the chute, as best shown in Fig. 6, and yieldingly retracted by a spring 40. The front ends of the leaf springs 38 and the lower end or lip of the hinge plate 39 do not interfere with the inward movement of the screw the shank of which is to be inserted through the opening in the washer, and at the same time they do not interfere with the ejection of the assembled product after assembly.

In line with the washer when located in the die or in the position just stated is a plunger 41. The plunger 41 is adjustably secured to a bolt 42 which is carried by a slide 43 mounted for horizontal reciprocating movement in a support 44 (see Figs. 2 and 5) mounted on extensions of the frame 23. The manner in which the plunger and the parts carrying it are reciprocated will be explained presently.

Substantially coincidentally with the delivery of a washer to the die in line with the plunger 41 a screw is positioned between the washer and the plunger 41 and the mechanism for causing the delivery of a screw to the assembly point at each cycle will now be explained. The screws are supplied from a hopper 45 which is suitably supported on an extension of the frame 23. The hopper and the means for delivering the screws from the hopper may be of standard form. The screws are picked up by an oscillatory plate 46 which is pivoted at 47 and has an extension projecting up through the bottom of the hopper and is grooved at its top so that the screws will arrange themselves side-by-side thereon with the heads at the top of the plate and the threaded shanks extending down into a groove or slot in the plate. As the plate swings upwardly, the screws are delivered into an inclined chute 48 (see particularly Fig. 4) at the top of which is a bar 49 high enough from the side walls of the chute to accommodate the heads of the screws. The position of this bar can be adjusted to accommodate screw heads of different sizes. At the top of the chute are some rotating toothed members 50 which are mounted on a shaft 51 and which brush off the chute and back into the hopper any screws which are delivered cross-wise or horizontally from the plate 46 to the chute.

Figure 11:
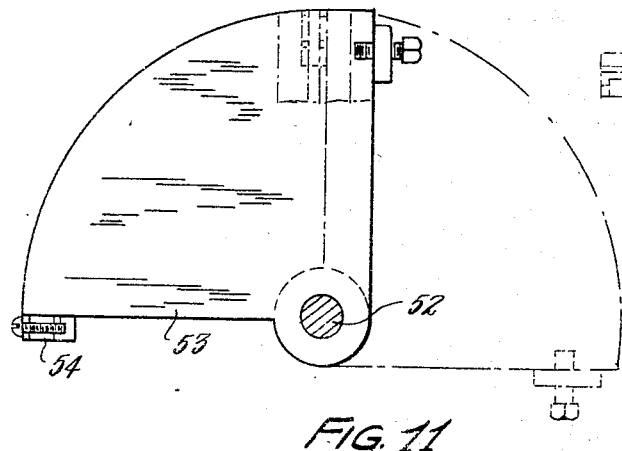
Fig. 11 is a side view of the transfer member for the screws, the shaft supporting the transfer member being in section along the line 11—11 of Fig. 4.
Figure 12:
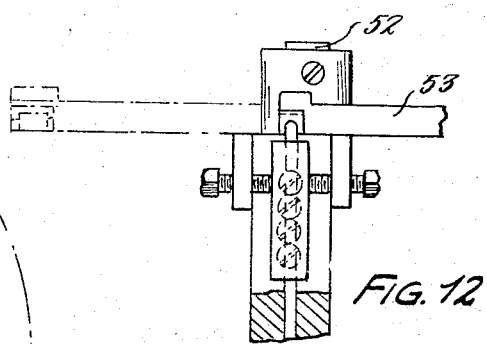
Fig. 12 is a fragmentary plan view viewed from the line 12—12 of Fig. 4 and showing the lower part of the delivery chute or guide for the screws and a portion of the transfer mechanism.
Figure 12A:
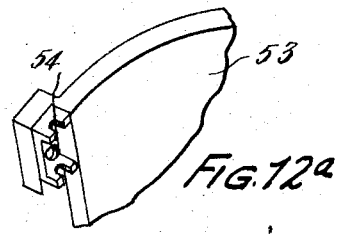
Fig. 12a is a fragmentary perspective view showing particularly the cradle mounted on the corner of the plate for delivering screws from the chute to the transfer fingers.

Secured to a rock shaft 52 mounted in inclined position at the bottom of the chute 48 is an inclined segment-shaped screw delivery plate 53 which is adapted to be swung from the dotted line position shown in Fig. 11, where it receives the screw from the lower end of the chute 48, to the full line position shown in the same figure.

At one corner of the chute is a receiving cradle 54 which may be formed from sheet metal and is provided with a pair of notches so positioned that when the plate 53 is swung to the dotted line position the cradle receives the lowermost screw in the chute 48, and then the plate 53 swings downward to the full line position shown in this figure, and in so doing the screw in the cradle is brought to horizontal position. However, since the body of the plate slides over the lower end of the chute, the discharge of the next screw is prevented until the plate is again returned to screw-receiving position.

When the screw reaches the position shown in Fig. 11 it is just in front of a pair of spring pick-up fingers 55 (see Fig. 4) which are carried on the end of an oscillating arm 56 mounted on a shaft 57 carried by the frame of the machine. This arm, which is cam-actuated in a manner to be explained presently, causes the pick-up fingers first to move forwardly and grasp the screw while in the cradle and then to be retracted slightly so as to allow the cradle with the plate 53 to be swung back to position the cradle to receive the next screw. Thereupon the arm 56 is again swung downwardly so as to carry the screw held by the fingers 55 to a position in line with the plunger 41 and the washer in the die. Then the plunger 41 is moved forward, and as it enters the washer and the opening in the die, the arm 56 swings backward carrying the fingers 55 to a position to receive the screw which is to receive a washer during the next cycle of operations.

Above I have described the main operating parts of the machine which are instrumental in the assembling of the washers on the screws, and I will next describe in detail the mechanism herein illustrated by which these parts are operated and will then describe the assorting mechanism which constitutes the invention covered by this application.

Power is supplied to the machine in any suitabe manner, but in this instance by a belt 58a which engages a pulley 58 on a shaft 59 suitably supported in horizontal position on the frame of the machine. As illustrated in Fig. 2, there is located at the side of the pulley 58 a loose pulley 60 onto which the belt 57 may be shifted if it is desired to stop the operation of the machine. The shaft 59 is connected by gearing 61 to a cam shaft 62 journaled on the frame of the machine (see the lower lefthand side of Fig. 1). From this cam shaft power is derived to actuate all the parts of the machine.

I will first describe the mechanism herein illustrated for actuating the disk 29 of the washer feeding mechanism. It will be observed that at the end of the cam shaft 62 shown in Fig. 1 a sprocket wheel is provided which, through the sprocket chain 63, rotates a shaft 64 which is supported by the frame of the machine beneath the washer hopper 27, shaft 64 being rotated at the same speed as cam shaft 62. This shaft 64, which, like the cam shaft, rotates continuously so long as the machine is in operation is provided with a cam 65 (see Fig. 2) which is engaged by a roller 66 carried by a pitman 67 the upper end of which has a ball and socket connection shown at 68 with one arm 69 of a bell crank 70 loosely mounted on the shaft 30 to which is secured the washer delivery disk 29. A spring 70a which is connected to the bell crank lever 70 keeps the roller 66 in contact with the periphery of the cam 65. The other arm 71 of the bell crank 70 carries a spring-pressed pawl 72 which engages a ratchet wheel 73 also mounted on the shaft 30. A yieldable driving connection is provided between the ratchet wheel 73 and the shaft 30, and the detail of this is shown in Fig. 3. It will be noted that the hub 74 of the ratchet wheel 73 is partly surrounded by a spiral spring 75. One end of this spring is anchored to the hub by means of a screw 76 or otherwise, and the other end of the spring is connected to a pin 77 which extends through an arc-shaped slot 78 in the hub and is connected to the shaft 30 to which the washer feeding disk 29 is secured. There are as many teeth in the ratchet 73 as there are washer receiving sockets at the periphery of the disk 29 and in each cycle of the machine the disk 29 is moved the distance between the teeth of the ratchet and therefore the disk is given an angular movement equal to the distance between the peripheral notches. At the completion of each movement of the ratchet wheel 73 one of the peripheral notches of the disk is brought opposite the mouth or entrance opening of the washer delivery chute 31, as shown in Fig. 4. The spring 75 normally functions to turn the shaft 30 and the disk 29 the full distance each time that the pawl 72 actuates the ratchet wheel, but if for any reason the washer feeding disk 29 becomes stalled, as by clogging of the washers, then the spring 75 will yield and the ratchet will make idle strokes back and forth without turning the disk 29 until the trouble is overcome, and this can take place without breakage of any of the parts.

It will be noted that the roller 66 which engages the cam 65 on shaft 64 has a rounded periphery and, as pointed out above, the upper end of the pitman 67 has a ball and socket connection with one arm of the bell crank on shaft 30. This arrangement permits the adjustment of the hopper 27 and the parts associated with it by turning the screw 28 after the usual holding screws have been loosened without disarranging the mechanism for imparting the step-by-step movements to the washer feeding disk.

Figure 8:
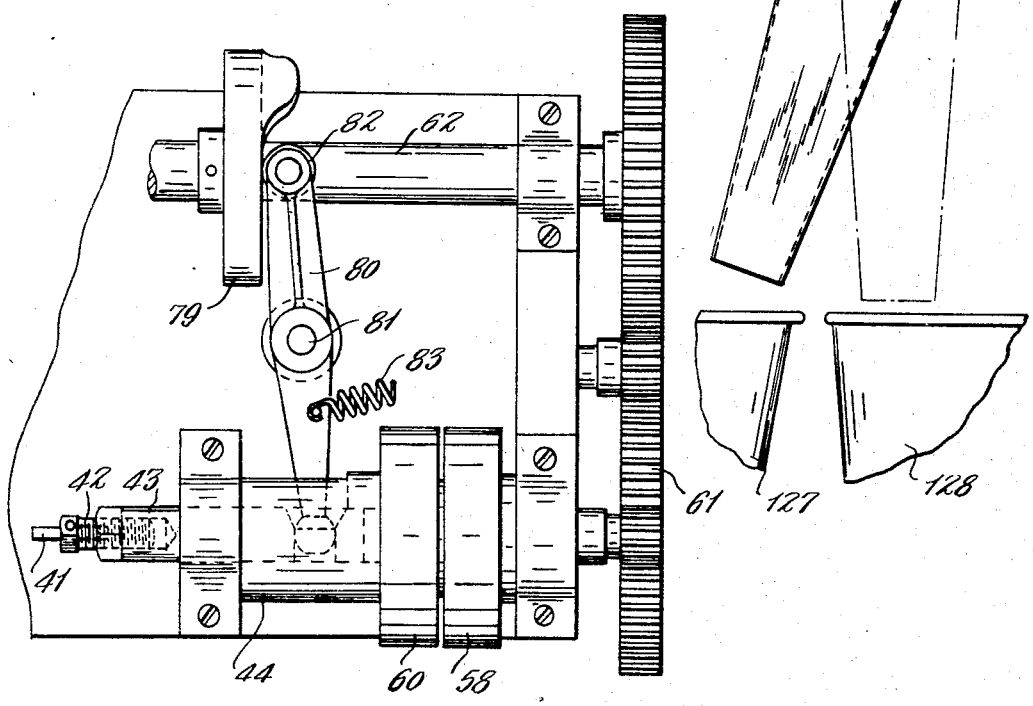
Fig. 8 is a fragmentary plan view on an enlarged scale showing particularly the pusher for inserting the screw through the center opening of the washer in the assembling operation.
Figure 9:
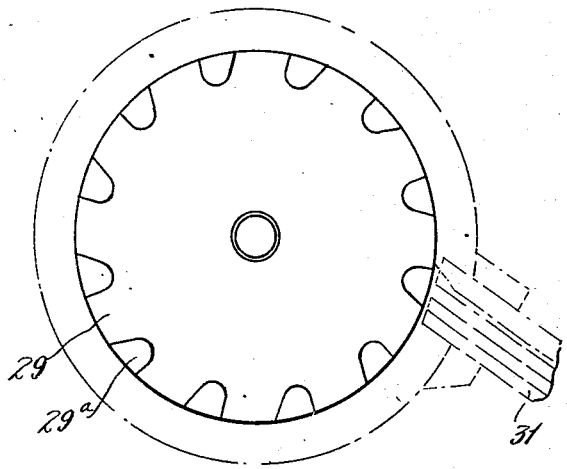
Fig. 9 is a detail of the disk utilized in the feeding of the washers, this view showing the disk as viewed from the line 9—9 of Fig. 10 and showing part of the hopper and part of the delivery chute by dotted lines.

The cam shaft 62 has other actuating cams and pulleys including a cam 79 (Fig. 8) which rocks a lever 80 pivoted at 81 on the frame of the machine, the lever having a roller 82 engaging the face of the cam. The lever 80 has an arm extending through the slot in the support 44 and operatively connected to the slide 43 so as to reciprocate the plunger 41 in predetermined timed relation with the other essential parts of the assembling mechanism. A spring 83 connected to the lever 80 keeps the roller 82 at the end of the lever 80 in engagement with the cam.

Additionally, the cam shaft 62 is provided with two cams both shown in Fig. 4 and designated 84 and 85, the former serving to operate the spring fingers 55 which in each cycle position the screw in line with the plunger 41. The lever 56 carrying the fingers has a roller 86 which engages the periphery of the cam 84 and is kept in engagement therewith by a suitable spring 87.

The cam 85 is utilized to swing the plate 53 which in each cycle of the machine carries a screw from the lower end of the chute 48 to a position in front of the fingers 55. This cam is engaged by a roller 88 at the lower end of a rod 89 which at its outed end is connected to a crank 90 at the upper end of the inclined shaft 52 to which the plate 53 is secured (see (Figs. 4 and 4a). A suitable spring 91 keeps the roller 88 in engagement with the periphery of cam 85.

The plate 46 which extends through the bottom of the screw hopper 45 and feeds the screws to the chute 48 is given an oscillatory movement about the axis of the pin or shaft 47 by the following means. On the cam shaft 62 is provided a pulley 92 shown in dotted lines in Fig. 4, and this is engaged by a belt 93 engaging a pulley 94 on a shaft 95 supported on the frame of the machine beneath the screw hopper 45. This shaft has a crank 96 carrying a roller 97 which engages the lower side of the plate 46, as clearly shown in Fig. 4.

The toothed wheels 50 which rotate adjacent to the upper end of the chute 48 are driven by a belt 98 engaging a pulley 99 on the shaft 51 which supports the toothed wheels and a pulley 100 on the cam shaft 62, this drive being illustrated in Fig. 1 but for the sake of clearness parts thereof have been omitted from Fig. 2.

There will next be described the mechanism for ejecting the assembled screw and washer from the die 33 and for operating the assorter for sorting out any screws which have failed to receive washers or any screws which are longer than the intended length for a given run of the machine.

When a screw is pushed inwardly by the plunger 41 (see Fig. 5), it moves backward or inward a kickout pin 101 which is slidably mounted in an anvil 102 which in turn is slidably supported by the die 33. At its rear end the anvil is connected to a kickout sleeve 103 which is adapted to have slight endwise sliding movement in the die block 34. The rear end of the kickout pin 101 has a head which engages a spring 104 which is located in the kickout sleeve 103 and is compressed when the kickout pin is moved back by the screw. Accordingly, when the plunger 41 is retracted, the spring 104 acting on the kickout pin will eject the screw from the die. However, since the washer which is now assembled on the screw is held in the die by the parts 38a of the leaf springs 38 and the lip 39a of the hinge plate 39, for the ejection of the screw and washer it is desired that simultaneously with the forward movement of the kickout pin 101 the anvil 102 be moved forwardly so as to apply ejecting force or pressure on the rear face of the washer sufficient to overcome the spring action of the washer retaining members referred to so as to guard against the washer being retained in the die when the screw is ejected. To accomplish this result, the anvil and the kickout sleeve 103 connected to it are positively moved forward a predetermined but adjustable distance in each cycle of the machine immediately following the retraction of the plunger 41. For this purpose there is provided on the cam shaft 62 a cam 105 (see Fig. 1) the face of which is engaged by a roller at one end of an arm 106 of a kickout lever 107, the roller being kept in engagement with the face of the cam by a spring 107a which is connected to the lever as shown in Fig. 5. The lever 107 has an upper arm 108 the upper end of which is provided with an adjustable hollow stud 109 (see Fig. 5), the stud being screwed into a threaded opening in the end of the arm 108 and held in adjusted position by a nut 109a. The head 108b of the stud engages the head 110 of a hollow plug 111 which is screwed in the outer end of the kickout sleeve 103. As the arm 108 is swung inwardly, the head of the stud 109, by its engagement with the head 110 of the plug 111, moves the kickout sleeve 103 and the anvil 102 forwardly so as to positively eject the washer from the die simultaneously with the ejection of the screw by the kickout pin 101. The distance that the kickout sleeve 103 is thus moved forwardly is adjustable by means of an adjusting pin 112 (see the upper part of Fig. 5) having an eccentric lower end engaging in a slot 113 in the kickout sleeve 103. When the stud 109 and the kickout sleeve 103 are moved forwardly by the lever 107 and the cam 105, a spring 114 is compressed and later restores these parts to their former positions, this spring surrounding a portion of the kickout sleeve 103, one end of the spring engaging a shoulder on the sleeve 103 and its other end engaging the rear end of the die block 34 (see Fig. 5).

The assorting mechanism will now be described. It will be noted particularly by reference to Fig. 5 that the plug 111 has a cylindrical and tubular extension 115 which extends forwardly inside the spring 104 which acts on the head of the kickout pin 101. Movable inside of this tubular extension 115 of the plug 111 is an assorter pin 116 the forward end of which is normally close to the head and, in fact, practically in contact with the head of the kickout pin 101 when the latter is in its rearmost position shown in Fig. 5 when a washer of predetermined thickness is assembled on a screw of intended length. To the rear end of this pin 116 is secured one end of a wire 117 extending freely through a hollow flexible cable 118 (shown in Figs. 2, 4, and 5). The pin 116 and the wire 117 are not moved endwise during the normal operation of the machine, but if the kickout pin 101 is moved rearwardly a greater than normal distance, as, for example, if a washer fails to be seated in the die when the screw is pushed in by the plunger 41 or if the screw is longer than intended, the head or rear end of the kickout pin 101 engages and moves endwise the pin 116 and consequently the wire 117. One end of the cable 118 is fastened in the plug 111 (Fig. 5) while its other end is fastened to a sleeve 120a (Fig. 7) adjustably mounted in a bracket 119 supported in a stationary position on the frame of the machine at the point best indicated at the righthand end of Fig. 1. It was mentioned above that one end of the wire 117 is attached to the pin 116 (Fig. 5). The other end of the wire 117 is connected to a pin 120 (Fig. 7) slidable in the sleeve 120a. The outer or free end of the pin 120 normally engages the end of an adjustable screw 120b which is carried by an arm 121 of a lever pivoted at 122 on the frame of the machine, as shown at the righthand side of Fig. 1 and as clearly illustrated in Fig. 7. A spring 120c holds the upper end of the lever arm 121 against an adjustable stop 120d (carried by bracket 119) with the adjustable screw 120b engaging the end of the pin 120. The other arm 123 of this lever extends downward and has a hook at its lower end which is normally engaged by the hooked free end of an arm 124 which is secured to one end of a shaft 125 (see Figs. 2, 4, and 7) which shaft is attached at its opposite end to a delivery chute 126 for the screw and washer assemblies.

Figure 7:
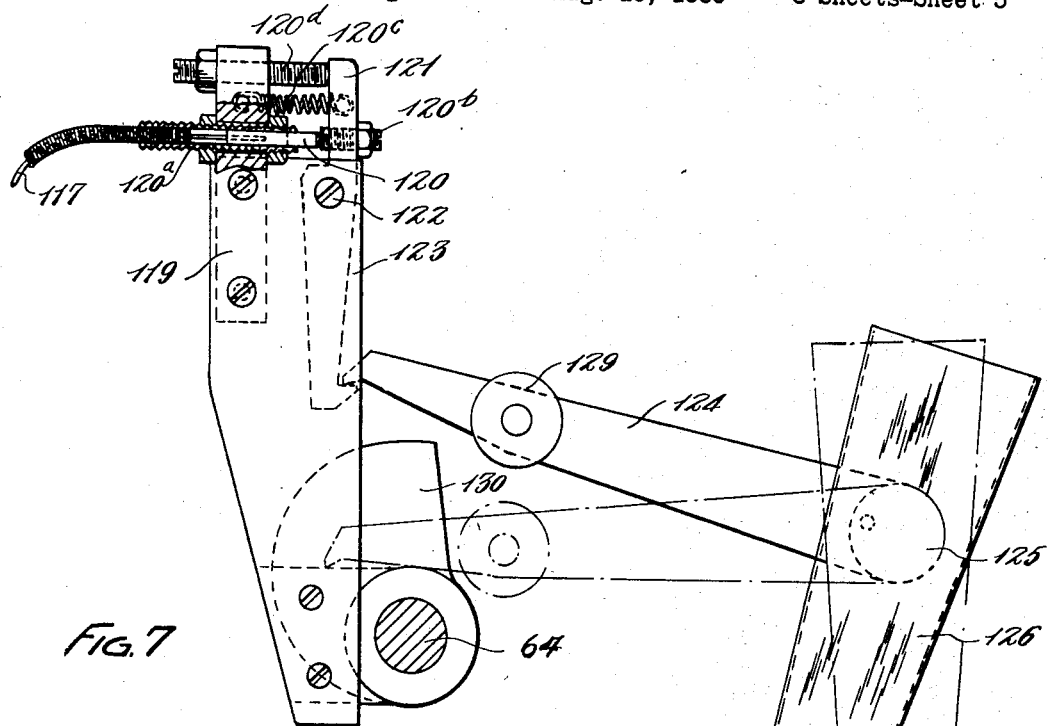
Fig. 7 is a detail view partly in section and partly in elevation showing a portion of the assorting mechanism which causes unassembled products to be discharged into a different receptacle than that which receives the properly assembled products with screws of normal or desired length.

Normally, this chute stands in the position shown in full lines in Fig. 7, its upper end being directly opposite the point of discharge of the assemblies when they are kicked from the die so that they will fall into the upper end of the chute and be delivered into a receptacle 127. The chute is capable of moving from the full line position shown in Fig. 7 to the dotted line position, and it is moved to this position to receive the washerless screws or the screw and washer assemblies having screws of longer than the desired length, in which case the latter are delivered into a second receptacle 128.

This movement of the chute occurs when the assorter pin 116 and the wire 117 are moved endwise, as previously explained, this movement being transmitted to the screw 120b carried by the arm 121 of the lever 121—123 and is sufficient to rock the hooked end of the arm 123 of the lever from under the free end of the arm 124 so as to allow the lever to drop from the full line position shown in Fig. 7 to the dotted line position and to thus rock the chute 126 from its full line position above the receptacle 127 to the dotted line position above the receptacle 128.

The arm 124 carries a roller 129 which is adapted to be engaged by a cam 130 to lift and restore the lever to its normal position, in which case the hooked end of lever 124 again reengages over the hooked end of the lever arm 123. The cam 130 is on the shaft 64 previously referred to. It will be understood that the pin 116 to which one end of the wire 117 is attached, as previously stated, will normally be out of the path of movement of the kickout pin 101 and normally the arm 124 will be supported in the full line elevated position shown in Fig. 7, and during the time that the arm is retained in its elevated position the cam 130 rotates idly. However, when a screw is inserted in the die 33 and the anvil 102 when there is no washer in the die, or if the screw is somewhat longer than desired, the kickout pin 101 will be given an inward movement greater than normal, and this increased movement is sufficient to move the assorter pin 116 rearwardly, and the movement thus imparted to the wire 117 is sufficient to disengage the hooked end of the lever arm 123 from beneath the hooked end of arm 124 so as to allow the arm 124 to drop and swing the delivery chute so that it will discharge into receptacle 128 instead of into receptacle 127. At the instant that the lever drops, the high part of the cam is out of the way of the roller so that the lever can drop to the dotted line position shown in Fig. 7. Then as cam 130 continues its movement, it will lift the lever to the full line position and its free end will again engage over the hooked end of lever arm 123, again restoring the chute 126 to its position to discharge the properly assembled screws and washers into the receptacle 127.

*Operation*

During each cycle of the machine the following operations or movements occur. Through the action of the cam 65 and the ratchet mechanism, the notched disk 29 in the washer hopper 23 is given one of its step-by-step movements sufficient to bring a washer to a position opposite the mouth of the chute 31, and the washer then drops out of the notch of the disk and slides down the chute and comes to a stop at the assembling point at the front of the die; it being remembered that one washer at a time is delivered to the chute 31. Substantially coincidentally with the delivery of a washer to the die a screw is delivered by the spring fingers 55 to a position in line with the washer and in line with the plunger 41. The feeding of the screws to the chute 48 is accomplished by the vertical swinging or oscillation of the plate 46, and the delivery of a screw to the position just stated is brought about by the swinging of the segment-shaped plate 53 through the medium of the cam 85 and by the delivery of the screw from the cradle of this plate by the spring fingers 55 actuated by the cam 84 and the lever 56 which carries the spring fingers 55. As soon as the screw is positioned in line with the plunger 41 the latter is moved inwardly by the action of the cam 79, the lever 80, and the slide 43, causing the screw to be moved inwardly and the washer to be slid onto the unthreaded portion of the shank of the screw next to the head.

On the retraction of the plunger 41 the kickout mechanism operates to simultaneously push the screw outward through the action of the spring-actuated kickout pin 101 and also to push out the washer so as to keep it in its proper assembled position on the screw, this being accomplished by the simultaneous forward movement of the anvil 102 and the kickout sleeve 103 produced by the movement of the lever 107 which movement is imparted by cam 105 on the cam shaft 62. Thereupon the kickout sleeve 103 is moved backward by the spring 114 and the kickout pin 101 will be moved backward when a screw is again inserted in the anvil in the next cycle of operations.

On the ejection of the assembled screw and washer, the screw and washer assembly falls into the chute 126 and is deposited in the receptacle 127. As previously explained, during the normal or proper operation of the machine the assorting mechanism is inactive, in which case the assorter pin 146 and the wire 117 are stationary and the lever 124 remains in its upper position with the cam 130 rotating idly beneath the roller 129. However, this assorting mechanism is at all times ready to act, and if a screw of greater length than that for which the machine is set is inserted in the anvil or if when a screw is moved into the anvil there is for some reason no washer in the die, then the kickout pin will be given an increased movement equal at least to the thickness of the washer, and this will be sufficient to move the assorter pin 116 and the wire 117 so as to shift the lever arm 123 and trip the arm 124 so as to allow what may be termed a defective product to be delivered into the receptacle 128. Thus the necessity for inspecting and manually sorting the defective parts from the assembled screws and washers having screws of normal length is avoided.

At this point it might be mentioned that the assorting mechanism is very sensitive and reliable, and while it is shown in connection with an assembling machine, it may have utility also in an assorting machine to sort screws or other products of different lengths.

While I have shown the preferred construction, I do not desire to be confined to the precise details or arrangements illustrated but aim in my claims to cover all modifications which do not involve a departure from the spirit and the scope of the invention.

Having thus described my invention, I claim:

1. The combination with a machine having an opening, means for inserting articles one at a time in said opening, and a kickout pin extending into said opening and adapted to be moved rearwardly with respect to the forward end of said opening when an article is inserted in the latter and serving thereafter to eject the article from the opening, of an assorting mechanism including a member for varying the points of delivery of the articles when the latter are ejected by the kickout pin, and means forming an operative connection between said member and said kickout pin including a part which is adapted to be shifted by the kickout pin so as to cause the actuation of said member when the kickout pin is moved more than a predetermined distance rearward by the insertion of an article in said opening.

2. The combination with a machine having an opening, means for inserting articles one at a time in said opening, and a kickout pin extending into said opening and adapted to be moved rearwardly with respect to the forward end of said opening when an article is inserted in the latter and serving thereafter to eject the article from the opening, of an assorting mechanism including a member for varying the points of delivery of the articles when the latter are ejected by the kickout pin, and means forming an operative connection between said member and said kickout pin including a part which is adapted to be shifted by the kickout pin so as to cause the actuation of said member when the kickout pin is moved more than a predetermined distance rearward by the insertion of an article in said opening, said part being endwise movable in line with the kickout pin.

3. The combination with a machine having an opening, means for inserting articles one at a time in said opening, and a kickout pin extending into said opening and adapted to be moved rearwardly with respect to the forward end of said opening when an article is inserted in the latter and serving thereafter to eject the article from the opening, of an assorting mechanism including a member for varying the points of delivery of the articles when ejected from the opening by the kickout pin, a latch mechanism controlling the movement of said member, and means forming an operative connection between said latch mechanism and the kickout pin including a part which is adapted to be shifted by the kickout pin so as to cause the actuation of said member when the kickout pin is moved more than a predetermined distance rearward by the insertion of an article in said opening.

4. A machine having a fixed die in which articles are adapted to be successively positioned, an endwise movable member at the rear of said die and having an opening extending therethrough, a reciprocating plunger for inserting an elongated article through the first named article which is in the die and into said opening, a spring-biased kickout pin extending into said opening and adapted to be moved rearwardly when the second named article is inserted in said opening by the plunger and adapted to move forwardly so as to eject the second article when the plunger is retracted, a movable member for controlling the points of delivery of the ejected articles depending upon the lengths of the second named articles, means forming an operative connection between said second named member and said kickout pin including a part adapted to be shifted by the kickout pin when the latter is moved rearwardly by one of the second named articles more than a predetermined distance, and means for moving said first named member forwardly coincidentally with the retraction of the plunger.

FRANK B. DAVIS.